(12) United States Patent
Hundley et al.

(10) Patent No.: US 11,998,978 B1
(45) Date of Patent: Jun. 4, 2024

(54) THERMOPLASTIC-ENCAPSULATED FUNCTIONALIZED METAL OR METAL ALLOY POWDERS

(71) Applicant: HRL Laboratories, LLC, Malibu, CA (US)

(72) Inventors: Jacob M. Hundley, Thousand Oaks, CA (US); John H. Martin, Oxnard, CA (US); Brennan Yahata, Los Angeles, CA (US); Julie Miller, Los Angeles, CA (US); Randall C. Schubert, Santa Monica, CA (US); Tobias A. Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 917 days.

(21) Appl. No.: 16/259,642

(22) Filed: Jan. 28, 2019

Related U.S. Application Data

(63) Continuation-in-part of application No. 15/880,488, filed on Jan. 25, 2018, now Pat. No. 11,117,193, and
(Continued)

(51) Int. Cl.
*B29C 64/165* (2017.01)
*B22F 1/054* (2022.01)
(Continued)

(52) U.S. Cl.
CPC ............... *B22F 1/16* (2022.01); *B22F 1/056* (2022.01); *B22F 1/18* (2022.01); *B22F 3/225* (2013.01);
(Continued)

(58) Field of Classification Search
CPC .................................................. B29C 64/164
See application file for complete search history.

(56) References Cited

U.S. PATENT DOCUMENTS

| 5,015,289 A | 5/1991 | Toda et al. |
| 5,064,463 A | 11/1991 | Ciomek |

(Continued)

FOREIGN PATENT DOCUMENTS

| JP | 2011054892 A | 3/2011 |
| KR | 1020080105250 A | 12/2008 |
| WO | 2005017220 A1 | 2/2005 |

OTHER PUBLICATIONS

Randall M. German, "Powder Injection Molding," ASM Handbook, vol. 7 (1998), pp. 355-364.*

(Continued)

*Primary Examiner* — Christopher S Kessler
(74) *Attorney, Agent, or Firm* — O'Connor & Company; Ryan P. O'Connor

(57) ABSTRACT

Some variations provide a functionalized composite material comprising: a thermoplastic polymer binder matrix disposed in a distinct volume; a plurality of discrete metal or metal alloy particles dispersed in the thermoplastic polymer matrix; and a plurality of discrete particulates assembled on surfaces of the discrete metal or metal alloy particles, wherein the discrete particulates are in contact with the thermoplastic polymer binder matrix, wherein the discrete particulates are smaller than the discrete metal or metal alloy particles in at least one dimension, and wherein the discrete particulates are compositionally different than the discrete metal or metal alloy particles. The discrete particulates may be selected and/or configured to function as a grain refiner, a sintering aid, and/or a strengthening phase, within the functionalized composite material.

14 Claims, 11 Drawing Sheets

Related U.S. Application Data a continuation-in-part of application No. 15/880,474, filed on Jan. 25, 2018, now Pat. No. 11,052,460.

(60) Provisional application No. 62/649,121, filed on Mar. 28, 2018, provisional application No. 62/463,952, filed on Feb. 27, 2017, provisional application No. 62/463,991, filed on Feb. 27, 2017, provisional application No. 62/452,989, filed on Feb. 1, 2017.

(51) Int. Cl.

| | | |
|---|---|---|
| *B22F 1/16* | (2022.01) | |
| *B22F 1/18* | (2022.01) | |
| *B22F 3/22* | (2006.01) | |
| *B22F 10/00* | (2021.01) | |
| *B33Y 70/00* | (2020.01) | |
| *B33Y 10/00* | (2015.01) | |

(52) U.S. Cl.
CPC ............ *B22F 10/00* (2021.01); *B29C 64/165* (2017.08); *B33Y 70/00* (2014.12); *B33Y 10/00* (2014.12)

(56) References Cited

U.S. PATENT DOCUMENTS

| | | | |
|---|---|---|---|
| 5,305,726 | A | 4/1994 | Scharman et al. |
| 5,340,012 | A | 8/1994 | Beeferman et al. |
| 5,462,712 | A | 10/1995 | Langan et al. |
| 6,024,915 | A | 2/2000 | Kume et al. |
| 6,071,628 | A | 6/2000 | Seals et al. |
| 6,254,757 | B1 | 7/2001 | Lashmore et al. |
| 6,368,427 | B1 | 4/2002 | Sigworth |
| 6,619,370 | B2 | 9/2003 | Sakamoto et al. |
| 9,238,877 | B2 | 1/2016 | Krause et al. |
| 2002/0033209 | A1* | 3/2002 | Kanoya ............ B22F 1/07 148/420 |
| 2002/0136884 | A1 | 9/2002 | Oechsner |
| 2003/0077473 | A1 | 4/2003 | Bretschneider et al. |
| 2003/0104147 | A1 | 6/2003 | Bretschneider et al. |
| 2005/0238528 | A1 | 10/2005 | Lin et al. |
| 2006/0065330 | A1 | 3/2006 | Cooper et al. |
| 2010/0124514 | A1* | 5/2010 | Chelluri ............ B22F 1/052 419/33 |
| 2010/0288243 | A1 | 11/2010 | Kaburagi et al. |
| 2012/0135142 | A1 | 5/2012 | Yang et al. |
| 2012/0315399 | A1 | 12/2012 | Feng et al. |
| 2013/0012643 | A1 | 1/2013 | Monsheimer et al. |
| 2013/0146041 | A1 | 6/2013 | Hijii et al. |
| 2013/0152739 | A1 | 6/2013 | Li et al. |
| 2015/0252451 | A1 | 9/2015 | Al-Aqeeli et al. |
| 2015/0337423 | A1 | 11/2015 | Martin et al. |
| 2017/0016095 | A1 | 1/2017 | Karlen et al. |
| 2017/0173692 | A1 | 6/2017 | Myerberg et al. |
| 2017/0252851 | A1 | 9/2017 | Fulop et al. |
| 2019/0015897 | A1* | 1/2019 | Roth-Fagaraseanu ...................... B22F 1/054 |

OTHER PUBLICATIONS

Chen et al., "Rapid control of phase growth by nanoparticles," Nature Communications 5:3879 DOI: 10.1038/ncomms4879.

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 (2016) 909-917.

Martin et al., "3D printing of high-strength aluminium alloys" Nature, vol. 549, Sep. 21, 2017.

\* cited by examiner

600

710  720

700

See FIG. 8B

THERMOPLASTIC-ENCAPSULATED FUNCTIONALIZED METAL OR METAL ALLOY POWDERS

PRIORITY DATA

This patent application is a non-provisional application with priority to U.S. Provisional Patent App. No. 62/649,121, filed on Mar. 28, 2018, which is hereby incorporated by reference herein. This patent application is also a Continuation-in-Part application of U.S. patent application Ser. No. 15/880,474, filed in Jan. 25, 2018, and of U.S. patent application Ser. No. 15/880,488, filed on Jan. 25, 2018, each of which is hereby incorporated by reference herein.

FIELD OF THE INVENTION

The present invention generally relates to methods of encapsulating functionalized metal or metal alloy powders, methods of using the encapsulated functionalized metal or metal alloy powders, and thermoplastic-encapsulated functionalized metal or metal alloy powders.

BACKGROUND OF THE INVENTION

Metal-based additive manufacturing, or three-dimensional (3D) printing, has applications in many industries, including the aerospace and automotive industries. Building up metal components layer by layer increases design freedom and manufacturing flexibility, thereby enabling complex geometries while eliminating traditional economy-of-scale constraints. Both metal injection molding and additive manufacturing utilize a sintering operation to consolidate and densify metal powders.

The incorporation of metal particulates into a thermoplastic binder is typically employed in processes such as metal injection molding or sintering-based additive manufacturing. The thermoplastic binder serves to impart geometry to the component through melting and flow into a defined shape. The metal powder encapsulated by the thermoplastic binder is sintered and densified into net shape after removal (debinding) of the thermoplastic matrix, once the part has taken on the desired geometry.

Commercial offerings exist in both the metal injection molding and sintering-based additive manufacturing spaces. Metal injection molding is by far the most mature of these processes, relying on the prior development of plastic injection molding tools, and pressurization and injection devices to introduce metal particulate-loaded polymers with similar geometric constraints. See for example U.S. Pat. No. 5,015,289 entitled "Method of preparing a metal body by means of injection molding" issued May 14, 1991 to Toda et al., U.S. Pat. No. 6,619,370 entitled "Method and apparatus for semi-molten metal injection molding" issued Sep. 16, 2003 to Sakamoto et al., and U.S. Pat. No. 5,064,463 entitled "Feedstock and process for metal injection molding" issued Nov. 12, 1991 to Ciomek.

Sintering-based additive manufacturing circumvents the limitations of injection molding by using a wire, rod, or powder feedstock where the thermoplastic binder is consolidated in place by means of a localized heat source. This approach has the advantage of fewer geometric restrictions along with the elimination of expensive mold tooling, the primary drawback for metal injection molding when employed for small production runs (<10,000 units). Several companies have been formed in the past few years utilizing various different hardware approaches to sintering-based additive manufacturing. See US 20170173692A entitled "Metal printer with vibrating ultrasonic nozzle" (Myerberg et al.) published Jun. 22, 2017 and US 20170252851A entitled "Additive manufacturing with metallic composites" (Fulop et al.) published Sep. 7, 2017.

Although useful for prototype applications, metal injection molding and additive manufacturing sintering processes that use thermoplastic binders often suffer from reduced thermomechanical performance due to the limited suite of available materials that are compatible with the debinding and sintering operations.

For practical implementation of these processes, the resulting metal structure must be near full density (i.e. no pores or residual thermoplastic binder), and ideally with thermal and mechanical performance comparable to cast, forged, or machined geometries produced from the same composition as the powder. In reality, metal injection molding or additive manufacturing parts generally do not meet these performance thresholds for two key reasons. First, high sintering temperatures and pressures required to consolidate high-strength alloy powders often leads to deformation of the debound part when the powder loading is less than 60% by volume. This constraint leads to lower compaction pressures and temperatures which in turn leads to a concomitant reduction in performance. Secondly, because these processes rely on sintering at temperatures near the melting point to densify the part, the processes are limited to alloys which exhibit favorable sintering responses in the semi-solid regime. This prior-art constraint limits the variety of alloys available. For instance, with many alloy systems, the presence of an oxide layer on the surface of the alloy powder inhibits sintering operations. Also, in many non-weldable alloy systems, the composition is susceptible to hot tearing or cracking at low liquid volume fractions.

Both metal injection molding and sintering-based additive manufacturing require that the powder be "sinterable" in order to achieve the final component's target density (typically 95-99%) and performance. Because sintering requires temperatures very near the melting point of the metal particulates, candidate materials for metal injection molding or additive manufacturing must be capable of surviving this heating and cooling cycle without cracking, tearing, coarsening, or forming brittle secondary phases. Additionally, given that the thermoplastic binder typically occupies more than 40% of the total part volume, the sintering pressures and temperatures required to consolidate the part must be sufficiently low so as to not cause deformation of the porous "brown body" metal structure. Both of these restrictions combine to limit the set of materials compatible with metal injection molding or additive manufacturing. For example, sintering-based additive manufacturing heretofore requires castable or weldable alloys, such as 4140 steel, Inconel 625, Ti6Al4V, or high-silicon aluminum alloys, that can consolidate to form a near full-density part without cracking. This prior-art constraint prevents the use of higher-performing iron, titanium, nickel or aluminum alloys that do not sinter under the conditions required for metal injection molding and additive manufacturing.

There is therefore a long-felt need in metal injection molding and sintering-based additive manufacturing processes for the incorporation of high-performance alloy systems. What is desired is a technology to retain desirable processing attributes of these approaches (e.g., complex geometries, low sintering pressures, and thermoplastic binders) while opening up the compatible material space through the use of particle functionalization. It would be beneficial to lower the energy barrier required to sinter. It would further be beneficial to form preferential microstructures during heating and consolidation to prevent tearing, cracking, or embrittlement upon cool down.

What is especially sought is a scalable and low-cost functionalized composite material, and method of making and using the functionalized composite material, to control the physical and mechanical properties of metal powders and the final metal structure during debinding and sintering operations.

SUMMARY OF THE INVENTION

The present invention addresses the aforementioned needs in the art, as will now be summarized and then further described in detail below.

Some variations provide a functionalized composite material comprising:
(a) a thermoplastic polymer binder matrix disposed in a distinct volume;
(b) a plurality of discrete metal or metal alloy particles dispersed in the thermoplastic polymer matrix; and
(c) a plurality of discrete particulates fully or partially assembled on surfaces of the discrete metal or metal alloy particles, wherein the discrete particulates are in contact with the thermoplastic polymer binder matrix, wherein the discrete particulates are smaller than the discrete metal or metal alloy particles in at least one dimension, and wherein the discrete particulates are compositionally different than the discrete metal or metal alloy particles.

In some embodiments, the discrete metal or metal alloy particles and the discrete particulates are encapsulated by the thermoplastic polymer binder matrix.

In some embodiments, additional discrete particulates are dispersed within the thermoplastic polymer binder matrix. These additional discrete particulates are not necessarily assembled on surfaces of the discrete metal or metal alloy particles.

In alternative but related embodiments, particulates are contained within the thermoplastic polymer binder matrix but are not initially assembled on surfaces of the discrete metal or metal alloy particles. When the thermoplastic polymer binder matrix is removed during a debinding operation or otherwise at a later time, the particulates assemble onto surfaces of the discrete metal or metal alloy particles. Therefore some variations provide a functionalized composite material comprising:
(a) a thermoplastic polymer binder matrix disposed in a distinct volume;
(b) a plurality of discrete metal or metal alloy particles dispersed in the thermoplastic polymer matrix; and
(c) a plurality of discrete particulates within the thermoplastic polymer binder matrix, wherein the discrete particulates are smaller than the discrete metal or metal alloy particles in at least one dimension, and wherein the discrete particulates are compositionally different than the discrete metal or metal alloy particles.

In some embodiments, the discrete metal or metal alloy particles have an average particle size from about 500 nanometers to about 1 centimeter, such as from about 1 micron to about 1 millimeter.

The metal or metal alloy particles may have a geometric shape selected from the group consisting of spherical, ellipsoidal, faceted, rod, platelet, asymmetric, and combinations thereof, for example.

In some embodiments, the discrete particulates have an average particulate size from about 1 nanometer to about 10 microns, such as about 10 nanometers to about 1 micron. In certain embodiments, the discrete particulates are discrete nanoparticles.

The discrete particulates may have a geometric shape selected from the group consisting of spherical, ellipsoidal, faceted, rod, platelet, asymmetric, and combinations thereof, for example.

The discrete particulates may be selected and/or configured to collectively function as a grain refiner, a sintering aid, a strengthening phase, or a combination thereof, within the functionalized composite material.

In some embodiments, the thermoplastic polymer binder matrix occupies from about 25 vol % to about 50 vol % of the distinct volume. In other embodiments, the thermoplastic polymer binder matrix occupies from about 50 vol % to about 75 vol % of the distinct volume.

In some embodiments, the discrete metal or metal alloy particles occupy from about 50% to about 75 vol % of the distinct volume. In other embodiments, the discrete metal or metal alloy particles occupy from about 25 vol % to about 50 vol % of the distinct volume.

In some embodiments, the discrete particulates occupy from about 0.01 vol % to about 3 vol % of the distinct volume. In other embodiments, the discrete particulates occupy from about 3 vol % to about 10 vol % of the distinct volume.

The metal or metal alloy particles may comprise an element selected from the group consisting of copper, aluminum, tungsten, iron, titanium, niobium, magnesium, cobalt, vanadium, nickel, zinc, chromium, molybdenum, palladium, silver, platinum, gold, and alloys or intermetallics thereof, for example.

The discrete particulates may comprise a material selected from the group consisting of metals, ceramics, polymers, carbon, and nitrides, hydrides, carbides, oxides, or alloys thereof, and combinations of any of the foregoing, for example.

The thermoplastic polymer binder matrix may comprise a polymer selected from the group consisting of natural or synthetic wax, paraffins, polyethylene, oxidized polyethylene, poly(ethylene-co-acrylic acid), polybutane, poly(vinyl acetate), polyacetyl, poly(ethylene-co-vinyl acetate), polystyrene, poly(methyl methacrylate), poly(vinyl butyral), polypropylene, or poly(ethylene glycol), and combinations thereof, for example. The thermoplastic polymer binder matrix is compositionally different than the metal or metal alloy particles and the discrete particulates.

Within the functionalized composite material, the thermoplastic polymer binder matrix may further comprise an additive selected from the group consisting of lubricants, pigments, catalysts, stabilizers, viscosity modifiers, and combinations thereof.

The functionalized composite material may be in the form of a feedstock selected from the group consisting of a powder, a pellet, a discontinuous rod, a continuous filament, a continuous wire, a continuous fiber, a sheet, a ribbon, and combinations thereof. In some variations, the feedstock is a metal injection molding feedstock or an additive manufacturing feedstock.

Other variations of the invention provide a method of forming a functionalized composite material, the method comprising:
(a) providing a plurality of discrete metal or metal alloy particles and a plurality of discrete particulates fully or partially assembled on surfaces of the discrete metal or metal alloy particles, wherein the discrete particulates are smaller than the discrete metal or metal alloy particles in at least one dimension, and wherein the discrete particulates are compositionally different than the discrete metal or metal alloy particles;

(b) disposing the discrete metal or metal alloy particles and the discrete particulates in a thermoplastic polymer binder matrix having a distinct volume, wherein the discrete particulates are in contact with the thermoplastic polymer binder matrix; and (c) recovering a functionalized composite material containing the thermoplastic polymer binder matrix, the discrete metal or metal alloy particles, and the discrete particulates assembled on surfaces of the discrete metal or metal alloy particles.

In some methods, the discrete metal or metal alloy particles and the discrete particulates are encapsulated by the thermoplastic polymer binder matrix during step (b), or during step (c).

Some methods further comprise debinding the thermoplastic polymer binder matrix from the functionalized composite material, thereby forming a partially dense brown body containing the discrete metal or metal alloy particles and the discrete particulates fully or partially assembled on surfaces of the discrete metal or metal alloy particles. The debinding step may be selected from the group consisting of solvent debinding, thermal debinding, catalytic debinding, and combinations thereof.

In some embodiments, the method further comprises sintering the partially dense brown body to form a dense body. Preferably, all of the thermoplastic polymer binder matrix has been removed prior to sintering, although small amounts of the thermoplastic polymer may remain and may be decomposed or reacted during sintering.

In certain embodiments, the functionalized composite material is simultaneously sintered and debound to form a dense body or to form an intermediate dense body that is later sintered to form a dense body.

In some methods, additional discrete particulates are dispersed within the thermoplastic polymer binder matrix, wherein the additional discrete particulates are not necessarily assembled on surfaces of the discrete metal or metal alloy particles. As noted above, in alternative methods, the particulates are initially contained within the thermoplastic polymer binder matrix but are not initially assembled on surfaces of the discrete metal or metal alloy particles. Instead, the discrete particulates assemble onto the discrete metal or metal alloy particles during debinding, sintering, or other operations.

The functionalized composite material may be recovered in the form of a feedstock selected from the group consisting of a powder, a pellet, a discontinuous rod, a continuous filament, a continuous wire, a continuous fiber, a sheet, a ribbon, and combinations thereof.

The method may further comprise metal injection molding and/or additive manufacturing the functionalized composite material. During metal injection molding and/or additive manufacturing, the discrete particulates may function as a grain refiner, a sintering aid, a strengthening phase, or a combination thereof.

DETAILED DESCRIPTION OF EMBODIMENTS OF THE INVENTION

Figure 1A:
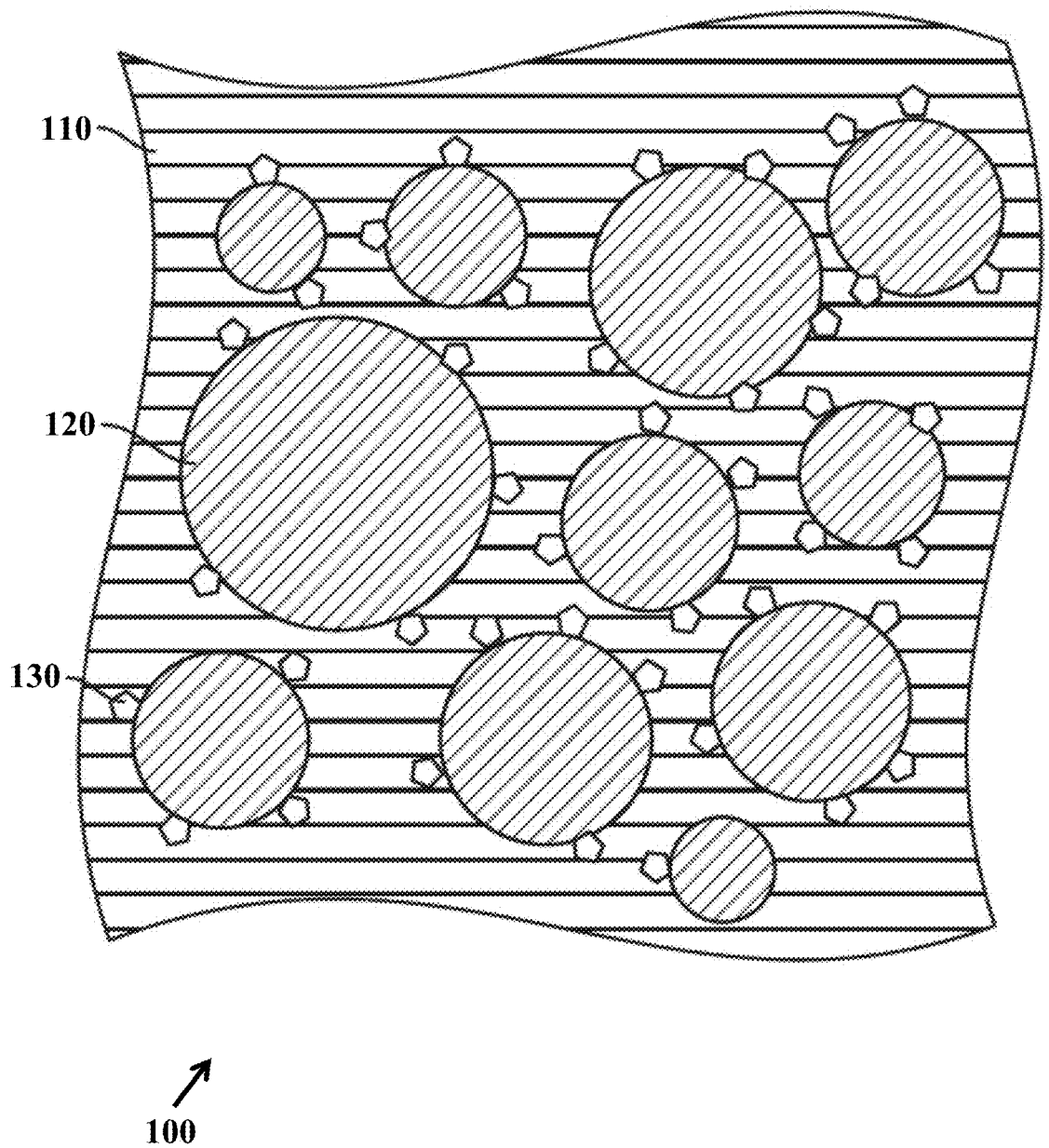
FIG. 1A shows a functionalized composite material in which discrete particulates are fully assembled on the surfaces of discrete metal or metal alloy particles, and a thermoplastic polymer that encapsulates and is in contact with both the metal or metal alloy particles as well as the discrete particulates.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of this invention are premised on structures and methods to control the sintering response of metal or metal alloy powders that are encapsulated in a thermoplastic binder, and to control the final microstructure obtained from operations involving sintering. Structures of the present invention, in preferred variations, incorporate three components to form a hybrid thermoplastic—metallic powder system. The three components are metal or metal alloy powder, particulates, and thermoplastic polymer.

In particular, the present invention provides a means to control the microstructure of a sintered part by utilizing discrete particulates (e.g., nanoparticles) fully or partially assembled on surfaces of a metal or metal alloy powder. Controlling the size, composition, relative loading, and distribution of discrete particulates alters the kinetics of sintering, melting, and solidification of the underlying metal powder, enabling many alloy systems to be usable in metal injection molding or sintering-based additive manufacturing operations. This invention therefore improves upon the possible feedstock materials heretofore usable in metal injection molding or sintering-based additive manufacturing operations, including high-performance alloy systems such as the 2000, 6000, or 7000 series of aluminum alloys or titanium alloys 15-3-3-3 and 6-2-4-2. This invention provides a means to retain desirable processing attributes (complex geometries, low sintering pressures, and thermoplastic binders) while opening up the compatible material space through the use of particulate functionalization to lower the energy barrier required to sinter and/or to form preferential microstructures during heating and consolidation to prevent tearing, cracking, or embrittlement upon cool down.

The structure provided in variations of this invention circumvents previous limitations through control of the sintering response and control of the ultimate microstructure in the finished component, by employing nanoparticles or other discrete particulates fully or partially assembled on the surface of the metal or metal alloy powder in contact with a thermoplastic binder. The size, composition, relative loading, and distribution of discrete particulates are selected based on the metal or metal alloy powder to be used and/or the target sintering temperature, pressure, and duration. After the part geometry is defined by a thermoplastic binder, at least some of the discrete particulates remain adhered to the surface of the metal or metal alloy powder, or may be forced into contact with the surface of the metal or metal alloy powder, during debinding. The discrete particulates serve to control microstructure of the sintered metal or metal alloy, as explained in more detail below.

Some variations provide a functionalized composite material comprising:
(a) a thermoplastic polymer binder matrix disposed in a distinct volume;
(b) a plurality of discrete metal or metal alloy particles dispersed in the thermoplastic polymer matrix; and
(c) a plurality of discrete particulates fully or partially assembled on surfaces of the discrete metal or metal alloy particles, wherein the discrete particulates are in contact with the thermoplastic polymer binder matrix, wherein the discrete particulates are smaller than the discrete metal or metal alloy particles in at least one dimension, and wherein the discrete particulates are compositionally different than the discrete metal or metal alloy particles.

A "distinct volume" means a coherent volume of material that contains at least discrete metal or metal alloy particles with discrete particulates surface-assembled thereon, and a thermoplastic polymer binder matrix that continuously (in space) surrounds the surface-functionalized metal or metal alloy particles. In some embodiments, the discrete metal or metal alloy particles and the discrete particulates are encapsulated by the thermoplastic polymer binder matrix. By "encapsulated" it is meant that the thermoplastic polymer binder matrix entirely surrounds the surface-functionalized metal or metal alloy particles, so that all exposed surfaces of the surface-functionalized metal or metal alloy particles are in contact with the thermoplastic polymer binder matrix. It will be recognized that even in an encapsulated material, at the outer edge of a given feedstock (e.g., a pellet), there may be some metal or metal alloy particles or particulates that are exposed to the environment rather than being covered by thermoplastic polymer binder matrix.

In some embodiments, the discrete metal or metal alloy particles have an average particle size from about 500 nanometers to about 1 centimeter, such as from about 1 micron to about 1 millimeter. In various embodiments, the discrete metal or metal alloy particles have an average particle size of about 0.5, 1, 5, 10, 25, 50, 100, 200, 300, 400, 500, 750, 1,000, 2,000, 3,000, 4,000, or 5,000 microns.

The metal or metal alloy (powder) particles may have a geometric shape selected from the group consisting of spherical, ellipsoidal, faceted, rod, platelet, asymmetric, and combinations thereof, for example. The powder particles may be characterized by an average aspect ratio from about 1:1 to about 100:1. The "aspect ratio" means the ratio of particle length to width. For a particle of arbitrary geometry, the length is taken to be the maximum effective diameter and the width is taken to be the minimum effective diameter.

Metal or metal alloy particles may be solid, hollow, or a combination thereof. These particles can be made by any means including, for example, gas atomization, thermal spray, cold spray, grinding, milling, cryomilling, wire explosion, laser ablation, electrical discharge, sputtering, vapor deposition, or other techniques known in the art.

The discrete particulates may be selected and/or configured to collectively function as a grain refiner, a sintering aid, a strengthening phase, or a combination thereof, within the functionalized composite material.

In some embodiments, the discrete particulates have an average particulate size from about 1 nanometer to about 50 microns, such as about 10 nanometers to about 10 micron, or about 50 nanometers to about 1 micron. In various embodiments, the discrete particulates have an average particulate size of about 5, 10, 25, 50, 100, 200, 300, 400, 500, 600, 700, 800, 900, or 1,000 nanometers, or about 1, 2, 3, 4, 5, 6, 7, 8, 9, 10, 20, 30, 40, or 50 microns. In certain embodiments, the discrete particulates are discrete nanoparticles (i.e., with a particle size less than 1000 nanometers in at least one dimension).

The ratio of average particle size of metal or metal alloy particles to average particle size of discrete particulates may vary, such as about 5, about 10, about $10^2$, about $10^3$, about $10^4$, or about $10^5$. In some embodiments, this ratio is from about 10 to about 1,000. Preferably, there is at least a 10× difference in particle size, in at least one direction, between the metal or metal alloy particles and the particulates (the metal or metal alloy particles must be larger than the particulates in at least one dimension). A 10× or greater a difference in particle size is preferred for better sintering.

The discrete particulates may have a geometric shape selected from the group consisting of spherical, ellipsoidal, faceted, rod, platelet, asymmetric, and combinations thereof, for example.

In some embodiments, the discrete particulates are fully assembled on surfaces of the discrete metal or metal alloy particles. "Fully assembled" means that substantially all of the discrete particulates that are present are assembled onto surfaces of the discrete metal or metal alloy particles (e.g., see FIG. 1A). In some embodiments, the discrete particulates are partially assembled on surfaces of the discrete metal or metal alloy particles. "Partially assembled" means that some of the discrete particulates are assembled onto surfaces of the discrete metal or metal alloy particles, while other discrete particulates are dispersed in the thermoplastic polymer matrix but not assembled onto surfaces of the discrete metal or metal alloy particles (e.g., see FIG. 2).

The assembled discrete particulates may be in the form of a monolayer, a multilayer, or less than one monolayer (e.g., from about 1% to 100% of one monolayer) and may be organized or unorganized at the powder (metal or metal alloy particles) surfaces, depending on the method employed.

The number of discrete particulates per metal or metal alloy particle may vary widely. The average number of individual particulates disposed on one metal or metal alloy particle (equivalently, the average number ratio of particulates to powder particles) may be 1, 2, 5, about 10, about $10^2$, about $10^3$, about $10^4$, about $10^5$, or about $10^6$, for example. In some embodiments (e.g., see FIG. 7), certain surface regions contain a relatively higher concentration of discrete particulates, which may be agglomerated in those regions. As explained below with reference to FIG. 3, in some embodiments, there are no discrete particulates assembled initially on metal or metal alloy particles but in the debinding process and/or the sintering process, assembly and surface functionalization take place.

The particulate surface coverage may also vary widely, from about 1% to 100%, in various embodiments. The particulate surface coverage is the average area fraction of powder particles that is covered by assembled particulates. For example, the particulate surface coverage may be about, or at least about, 1%, 5%, 10%, 20%, 30%, 40%, 50%, 60%, 70%, 80%, 90%, or 100%. Due to the small size of particulate, benefits are possible with less than 1% surface area coverage. Also, as noted in the preceding paragraph, in alternative embodiments the particulate surface coverage is initially 0% but in the debinding process and/or the sintering process, assembly and surface functionalization take place, resulting in a surface coverage of about 1% or more, for example.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random). In some embodiments, the coating is smooth and conformal to the underlying surface. In other embodiments, the coating is nodular, such as due to kinetic limitations associated with assembly of particulates on powder surfaces. For example, the coating may look like cauliflower or a small fractal growing from the surface. These features can be affected by the underling materials, the method of coating, reaction conditions, etc.

Typical production routes for the discrete particulates include electrical discharge, atomization, grinding, milling (including at ambient, elevated, or cryogenic temperatures), sputtering, spraying, vapor deposition, or other known processes able to produce materials of sizes from about 1 nanometer to about 50 microns.

In some embodiments, the discrete particulates are specifically particulate grain refiners added to the metal powder in order to control the melting, solidification, and sintering response of the alloy during consolidation under heat and pressure. Particulate grain-refiner compositions are selected from materials dissimilar from the alloy powder, based on compatibility with both the alloy powder and the thermoplastic binder. These grain-refining particulates may be composed of an element or alloy that forms an intermetallic phase with a component of the metal alloy powder. Alternatively, binary-compound nanoparticles that disassociate at elevated temperatures, such as hydrides, nitrides, carbides, or alloys thereof, may be used since the disassociation reaction typically annihilates any oxide shell on the surface of the metal alloy powder during sintering. These grain-refining particulates may have a size range between 10 nanometers and 50 micron. In the bound, encapsulated, or compounded state, the grain-refining particulates may comprise up to 10% of the total volume, including the binder and alloy powder, for example. The grain-refining particulate geometry may be spherical, platelet, faceted, ellipsoidal, asymmetric, or a combination thereof.

It is emphasized that the discrete particulates may act in other ways and are by no means limited to grain refinement. For example, the discrete particulates may function as sintering aids with reduced melting points; eutectic liquid formers; materials that react with the microparticle surface to disrupt oxides or other surface features and promote sintering through a change in surface energy; etc. Alternatively, or additionally, the discrete particulates may be incorporated as a secondary strengthening phase to increase the material strength and wire resistance of a metal-injection-molded alloy, with the added benefit of uniform distribution provided by the functionalization approach taught herein.

Discrete particulates may be attached to the metal or metal alloy particles using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof. Exemplary techniques to attach discrete particulates to metal or metal alloy particles are described in commonly owned U.S. patent application Ser. No. 15/880,474, filed Jan. 25, 2018, which is hereby incorporated by reference herein.

In some embodiments, the thermoplastic polymer binder matrix occupies from about 25 vol % to about 50 vol % of the distinct volume. In other embodiments, the thermoplastic polymer binder matrix occupies from about 50 vol % to about 75 vol % of the distinct volume. In various embodiments, the thermoplastic polymer binder matrix occupies about 10, 20, 30, 40, 50, 60, 70, 80, or 90 vol % of the distinct volume.

In some embodiments, the discrete metal or metal alloy particles occupy from about 50% to about 75 vol % of the distinct volume. In other embodiments, the discrete metal or metal alloy particles occupy from about 25 vol % to about 50 vol % of the distinct volume. In various embodiments, the discrete metal or metal alloy particles occupy about 10, 20, 30, 40, 50, 60, 70, 80, or 90 vol % of the distinct volume. In the encapsulated, bound, or compounded state, including the thermoplastic binder and the particulates, the metal alloy powder occupies up to 65% of the total volume, in some embodiments. After definition of the part geometry and removal of the binder (via debinding), the metal alloy powder may comprise the bulk (>90% by volume) of the sintered metallic part, in some embodiments.

In some embodiments, the discrete particulates occupy from about 0.01 vol % to about 3 vol % of the distinct volume. In other embodiments, the discrete particulates occupy from about 3 vol % to about 10 vol % of the distinct volume. In various embodiments, the discrete particulates occupy about 0.001, 0.01, 0.05, 0.1, 0.5, 1, 2, 3, 4, 5, 10, 15, 20, or 25 vol % of the distinct volume.

The metal or metal alloy particles may comprise an element selected from the group consisting of copper, aluminum, tungsten, iron, titanium, niobium, magnesium, cobalt, vanadium, nickel, zinc, chromium, molybdenum, palladium, silver, platinum, gold, and alloys or intermetallics thereof, for example. In the case of alloys, the metal or metal alloy particles may comprise at least 50 wt %, at least 60 wt %, at least 70 wt %, at least 80 wt %, at least 90 wt %, or at least 95 wt % of an element selected from the group consisting of copper, aluminum, tungsten, iron, titanium, niobium, magnesium, cobalt, vanadium, nickel, zinc, chromium, molybdenum, palladium, silver, platinum, gold, or intermetallics thereof, for example. In some preferred embodiments, a single metal alloy powder composition is used. Optionally, a plurality of metal alloy compositions are incorporated into the same thermoplastic binder.

The discrete particulates may comprise a material selected from the group consisting of metals, ceramics, polymers, carbon, and nitrides, hydrides, carbides, oxides, or alloys thereof, and combinations of any of the foregoing, for example.

Generally speaking, the materials herein may contain one or more alloying elements (whether or not they are the discrete particulates) selected from the group consisting of Si, Fe, Cu, Ni, Mn, Mg, Cr, Zn, V, Ti, Bi, Ga, Pb, or Zr. Other alloying elements may be included, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These alloying elements may function as grain refiners, as strength enhancers, as stability enhancers, or a combination thereof.

The thermoplastic polymer binder matrix creates a continuous interface connecting the discontinuous alloy powder particles and the particulates. The binder matrix is designed to melt, flow, and form a coherent volume, conforming to a given geometry in response to the application of a directed or volumetric heating source, such as an oven, furnace, infrared lamp, laser, resistive wire, or heated fluid, for example.

In some embodiments of this invention, the thermoplastic polymer binder matrix occupies at least 30 vol % of the total volume in the encapsulated, bound, or compounded state and is at least partially (and preferably completely) removed from the part prior to sintering. The removal of thermoplastic polymer binder matrix is called debinding, which may include solvent debinding, thermal debinding, catalytic debinding, or a combination thereof.

The thermoplastic polymer binder matrix is compositionally different than the metal or metal alloy particles and the discrete particulates. The thermoplastic polymer binder matrix may comprise a polymer selected from the group consisting of natural or synthetic wax, paraffins, polyethylene (including low-density polyethylene or high-density polyethylene), oxidized polyethylene, poly(ethylene-co-acrylic acid), polybutane, poly(vinyl acetate), polyacetyl, poly(ethylene-co-vinyl acetate), polystyrene, poly(methyl methacrylate), poly(vinyl butyral), polypropylene, or poly(ethylene glycol), and combinations thereof, for example.

The thermoplastic polymer binder matrix may be a neat polymer or may be a blended polymer containing multiple types of polymer, and optionally various additives. The thermoplastic polymer binder matrix may include amorphous, crystalline, and/or semi-crystalline polymers that are compatible with common debinding processes such as solvent debinding, thermal debinding, or catalytic debinding.

Within the functionalized composite material, the thermoplastic polymer binder matrix may further comprise an additive selected from the group consisting of lubricants, pigments, catalysts, stabilizers, viscosity modifiers, and combinations thereof.

The functionalized composite material may be in the form of a feedstock selected from the group consisting of a powder, a pellet, a discontinuous rod, a continuous filament, a continuous wire, a continuous fiber, a sheet, a ribbon, and combinations thereof. In some variations, the feedstock is a metal injection molding feedstock, an additive manufacturing feedstock, a hot-pressing feedstock, an extrusion feedstock, or a sintering feedstock.

Figure 6:
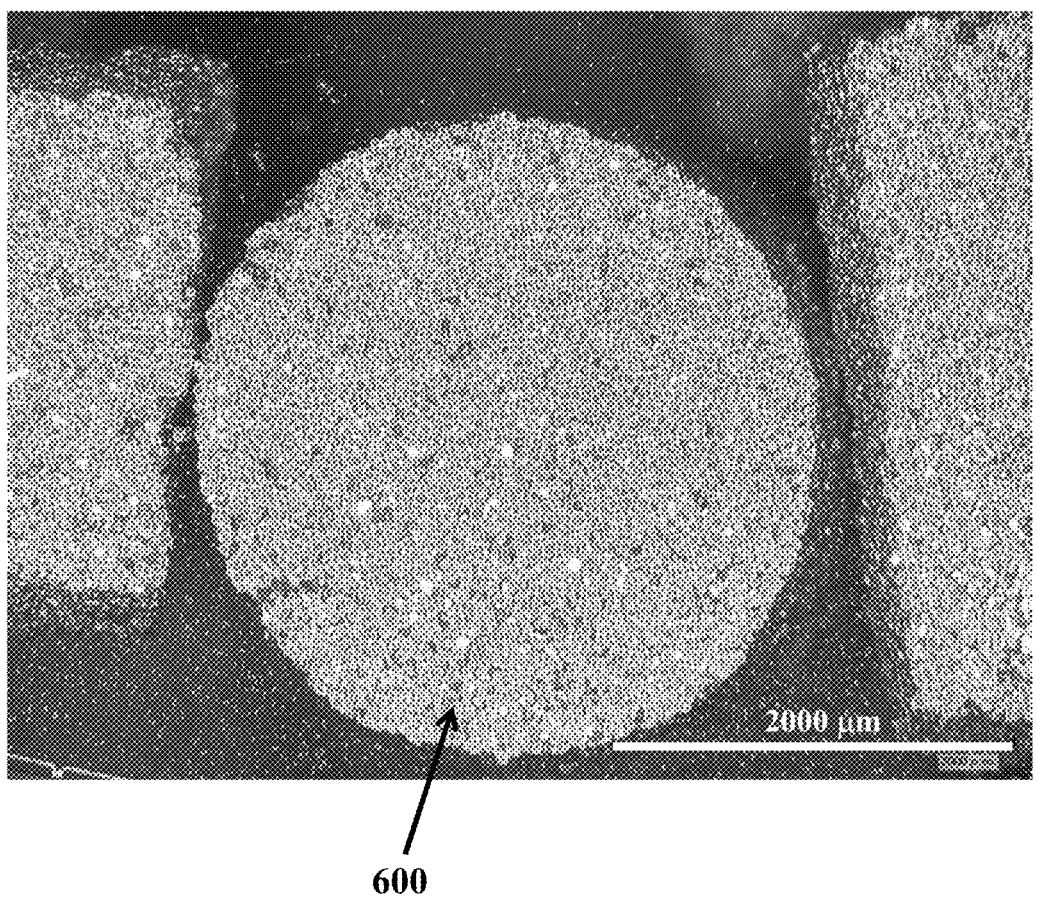
FIG. 6 shows an optical image of a compounded pellet of the functionalized composite material, in some embodiments.

In some preferred embodiments, the compounded composite material—i.e., the alloy powder plus particulates dispersed in a thermoplastic matrix—takes the form of a discontinuous pelletized feedstock (see FIG. 6 as one illustration). In alternative embodiments, the compounded composite material may be formed into a powder, a discontinuous rod, a continuous fiber, a filament, a wire, a sheet or a ribbon, or other parts, for example.

In some embodiments, additional discrete particulates are dispersed within the thermoplastic polymer binder matrix. These additional discrete particulates are not necessarily assembled on surfaces of the discrete metal or metal alloy particles. In alternative but related embodiments, particulates are contained within the thermoplastic polymer binder matrix but are not initially assembled on surfaces of the discrete metal or metal alloy particles. When the thermoplastic polymer binder matrix is removed during a debinding operation or otherwise at a later time, the particulates assemble onto surfaces of the discrete metal or metal alloy particles.

Some variations provide a functionalized composite material comprising:
 (a) a thermoplastic polymer binder matrix disposed in a distinct volume;
 (b) a plurality of discrete metal or metal alloy particles dispersed in the thermoplastic polymer matrix; and
 (c) a plurality of discrete particulates within the thermoplastic polymer binder matrix, wherein the discrete particulates are smaller than the discrete metal or metal alloy particles in at least one dimension, and wherein the discrete particulates are compositionally different than the discrete metal or metal alloy particles.

Other variations of the invention provide a method of forming a functionalized composite material, the method comprising:
 (a) providing a plurality of discrete metal or metal alloy particles and a plurality of discrete particulates fully or partially assembled on surfaces of the discrete metal or metal alloy particles, wherein the discrete particulates are smaller than the discrete metal or metal alloy particles in at least one dimension, and wherein the discrete particulates are compositionally different than the discrete metal or metal alloy particles;
 (b) disposing the discrete metal or metal alloy particles and the discrete particulates in a thermoplastic polymer binder matrix having a distinct volume, wherein the discrete particulates are in contact with the thermoplastic polymer binder matrix; and
 (c) recovering a functionalized composite material containing the thermoplastic polymer binder matrix, the discrete metal or metal alloy particles, and the discrete particulates assembled on surfaces of the discrete metal or metal alloy particles.

In some methods, the discrete metal or metal alloy particles and the discrete particulates are encapsulated by the thermoplastic polymer binder matrix during step (b), or during step (c), or both during step (b) and during step (c).

Some methods further comprise debinding the thermoplastic polymer binder matrix from the functionalized composite material, thereby forming a partially dense brown body containing the discrete metal or metal alloy particles and the discrete particulates fully or partially assembled on surfaces of the discrete metal or metal alloy particles.

The debinding step may be selected from the group consisting of solvent debinding, thermal debinding, catalytic debinding, and combinations thereof. Debinding techniques are well-known in the art. See, for example, U.S. Patent App. Pub. No. US20180154438 to Mark, published Jun. 7, 2018, which is hereby incorporated by reference herein for its teachings of debinding techniques.

Solvents for debinding may include water, toluene, isopropyl alcohol, heptane, acetone, trichloroethylene, or combinations thereof, for example. In various embodiments, thermal debinding may take place at temperatures from about 30° C. to about 800° C., such as temperature selected from about 20-70° C., 70-120° C., 120-180° C., 180-350° C., 350-500° C., or 500-800° C. Certain exemplary temperatures for thermal debinding are 30° C., 50° C., 100° C., 120° C., 170° C., 200° C., 220° C., 250° C., 300° C., 350° C., 450° C. and 500° C. When catalytic debinding is employed, various catalysts may be utilized, such as (but not limited to) nitric acid. In some embodiments of catalytic debinding, controlled degradation is carried out in an acidic vapor (e.g., nitric acid vapor). Combinations may be employed. In some embodiments, debinding is thermal debinding with a debinding solvent. In some embodiments, debinding is catalytic debinding with a debinding solvent. In certain embodiments, debinding is a combination of thermal, catalytic, and solvent debinding (e.g., nitric acid vapor as debinding catalyst at elevated temperature and pressure in supercritical carbon dioxide as solvent).

In some embodiments, the method further comprises sintering the partially dense brown body to form a dense body. Preferably, all of the thermoplastic polymer binder matrix has been removed prior to sintering, although small amounts of the thermoplastic polymer may remain and may be decomposed or reacted during sintering.

In certain embodiments, the functionalized composite material is simultaneously sintered and debound to form a dense body or to form an intermediate dense body that is later sintered to form a dense body. For example, thermal debinding may be employed at a suitable temperature that also is effective for sintering, or for a first stage or amount of sintering, followed by a higher sintering temperature.

In some methods, additional discrete particulates are dispersed within the thermoplastic polymer binder matrix, wherein the additional discrete particulates are not necessarily assembled on surfaces of the discrete metal or metal alloy particles. As noted above, in alternative methods, the particulates are initially contained within the thermoplastic polymer binder matrix but are not initially assembled on surfaces of the discrete metal or metal alloy particles (e.g., see FIG. 3). Instead, the discrete particulates assemble onto the discrete metal or metal alloy particles during debinding, sintering, or other operations.

Some preferred embodiments are depicted in FIG. 1A. A functionalized composite material 100 is provided in which discrete particulates 130 are fully assembled on the surfaces of discrete metal or metal alloy particles 120. A thermoplastic polymer 110 encapsulates and is in contact with both the metal or metal alloy particles 120 as well as the discrete particulates 130, within a distinct volume. There is a distinct interface between the particulates 130 and the powder particles 120, and these two components are not separated by the thermoplastic polymer 110. In some embodiments, the thermoplastic polymer 110 may be referred to as a continuous thermoplastic polymer, i.e. the thermoplastic polymer 110 forms spatially continuous connections within the functionalized composite material 100.

Figure 1B:
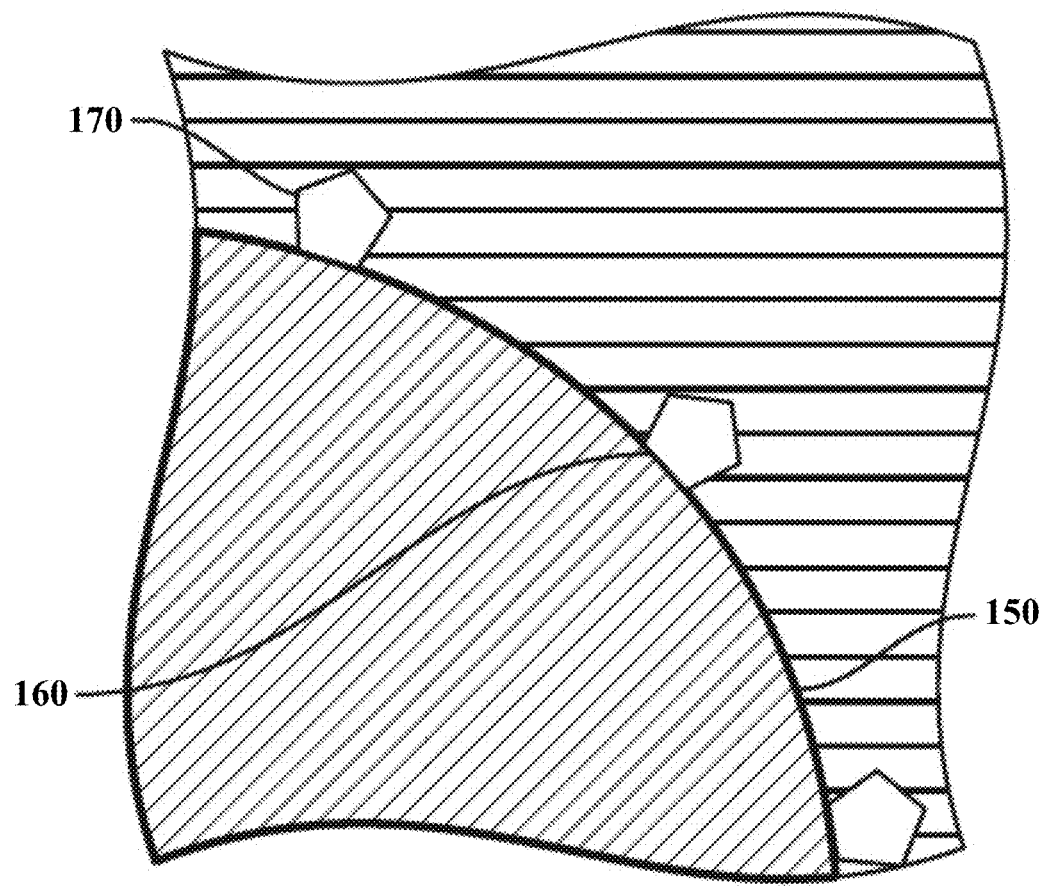
FIG. 1B is a zoomed-in portion of FIG. 1A, showing a functionalized composite material in which discrete particulates are assembled on the surfaces of discrete metal or metal alloy particles, and a thermoplastic polymer that encapsulates and is in contact with both the metal or metal alloy particles as well as the discrete particulates.

FIG. 1B is a zoomed-in portion of FIG. 1A. FIG. 1B shows a metal alloy—thermoplastic interface 150, a metal alloy—particulate interface 160, and a particulate—thermoplastic interface 170. Note that the metal alloy—particulate interface 160 is at the outer surface of the metal or metal alloy particles, and likewise, the metal alloy—thermoplastic interface 150 is at the outer surface of the metal or metal alloy particles. The difference is that at interface 150, there is no particulate present, while at interface 160, there is a particulate present. In certain embodiments in which there is complete surface coverage (assembly) of particulates on metal or metal alloy particles, then interface 150 will not be present unless thermoplastic polymer has diffused through the particulate surface layer to reach the surface of metal or metal alloy particles.

In alternative embodiments, particulates may be physically separated in part (FIG. 2) or completely (FIG. 3) from the alloy powder by the thermoplastic binder.

Figure 2:
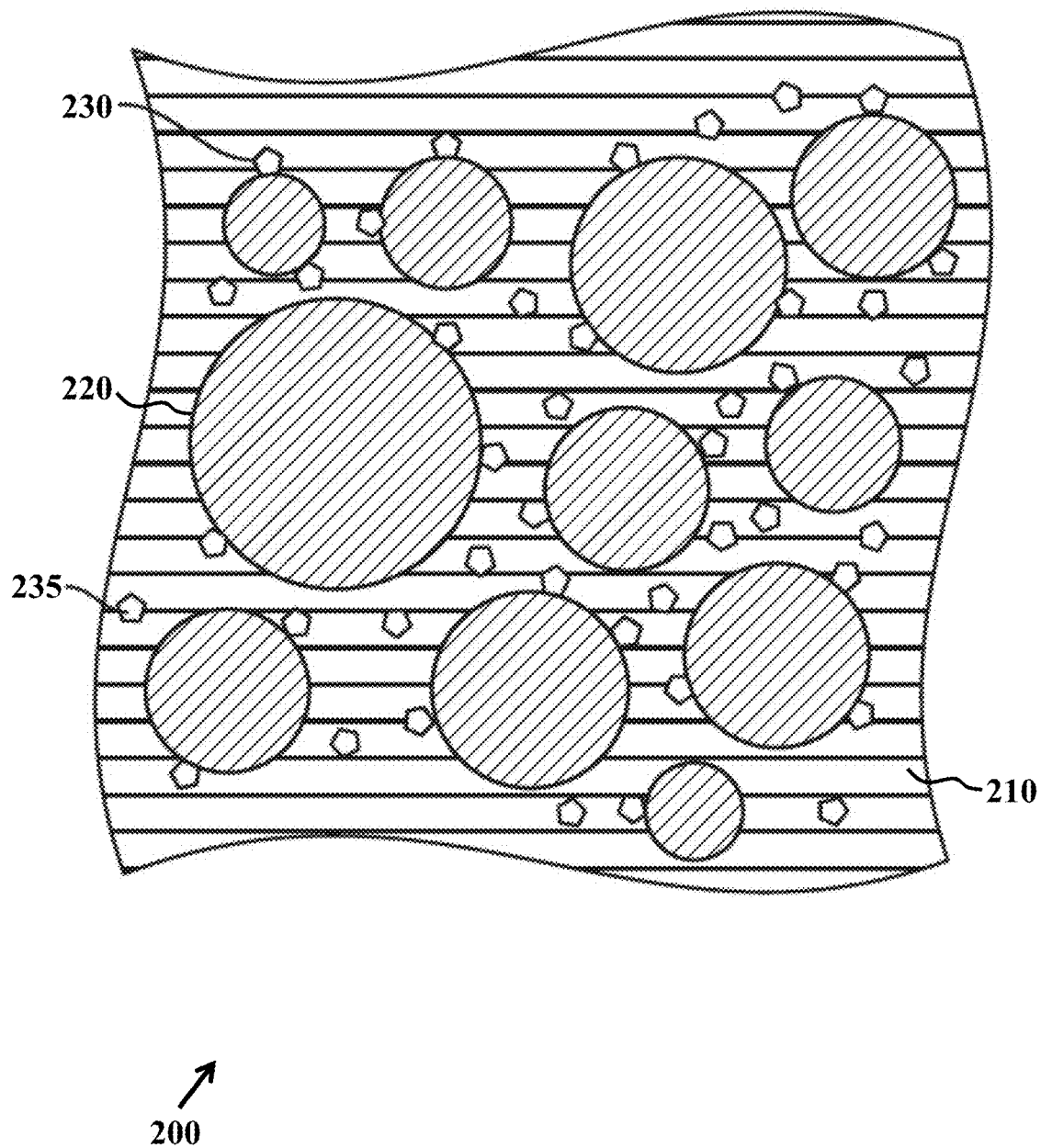
FIG. 2 shows a functionalized composite material in which discrete particulates are partially assembled on the surfaces of discrete metal or metal alloy particles, with non-assembled discrete particulates dispersed within a thermoplastic polymer that encapsulates and is in contact with both the metal or metal alloy particles as well as the discrete particulates.

In FIG. 2, a functionalized composite material 200 is provided in which discrete particulates 230 are assembled on the surfaces of discrete metal or metal alloy particles 220. A thermoplastic polymer 210 encapsulates and is in contact with both the metal or metal alloy particles 220 as well as the discrete particulates 230, within a distinct volume. In addition, discrete particulates 235 are dispersed within the thermoplastic polymer 210 but are not assembled on surfaces of discrete metal or metal alloy particles 220. Taken together, discrete particulates 230/235 are considered to be partially assembled on the surfaces of discrete metal or metal alloy particles 220. Contact between the metal or metal alloy particles 220 and the discrete particulates 230 occurs only for a subset of the total number of discrete particulates 230 in the distinct volume.

Figure 3:
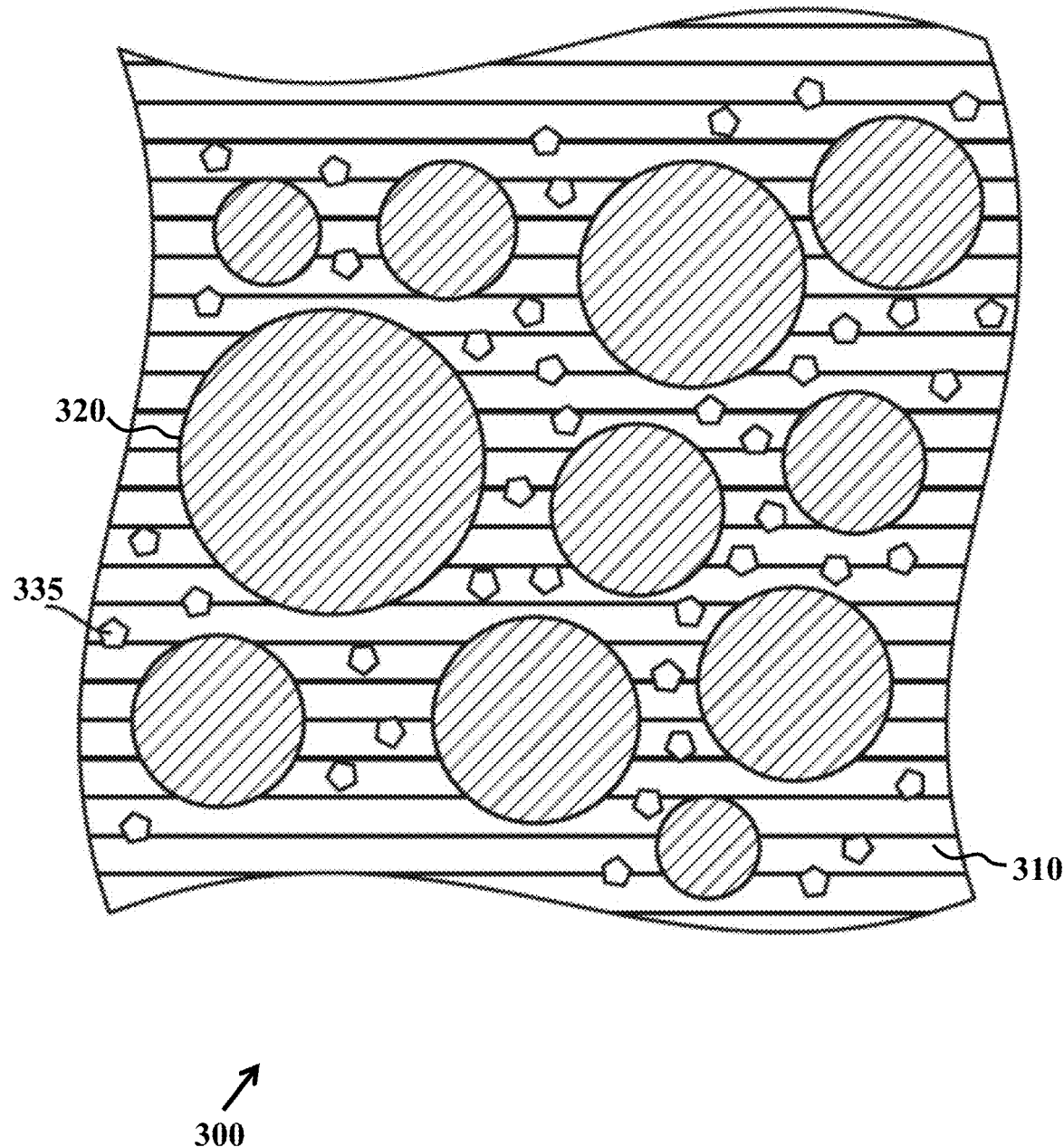
FIG. 3 shows a functionalized composite material in which discrete particulates are dispersed within a thermoplastic polymer but are not assembled on surfaces of discrete metal or metal alloy particles, and a thermoplastic polymer that encapsulates and is in contact with both the metal or metal alloy particles as well as the discrete particulates.

In FIG. 3, a functionalized composite material 300 is provided in discrete particulates 335 are dispersed within a thermoplastic polymer 310 but are not assembled on surfaces of discrete metal or metal alloy particles 320. The thermoplastic polymer 310 encapsulates and is in contact with both the metal or metal alloy particles 320 as well as the discrete particulates 335, within a distinct volume. The discrete particulates 335 are not yet assembled onto surfaces of discrete metal or metal alloy particles 320, but with additional processing (e.g., debinding, sintering, etc.), some or all of the discrete particulates 335 may assemble onto powder surfaces, such as shown in FIG. 1 or 2.

The functionalized composite material may be recovered in the form of a feedstock selected from the group consisting of a powder, a pellet (e.g., see FIG. 6), a discontinuous rod, a continuous filament, a continuous wire, a continuous fiber, a sheet, a ribbon, and combinations thereof. These feedstock geometries may be obtained from pressing, extrusion, milling, or other operations.

Figure 4:
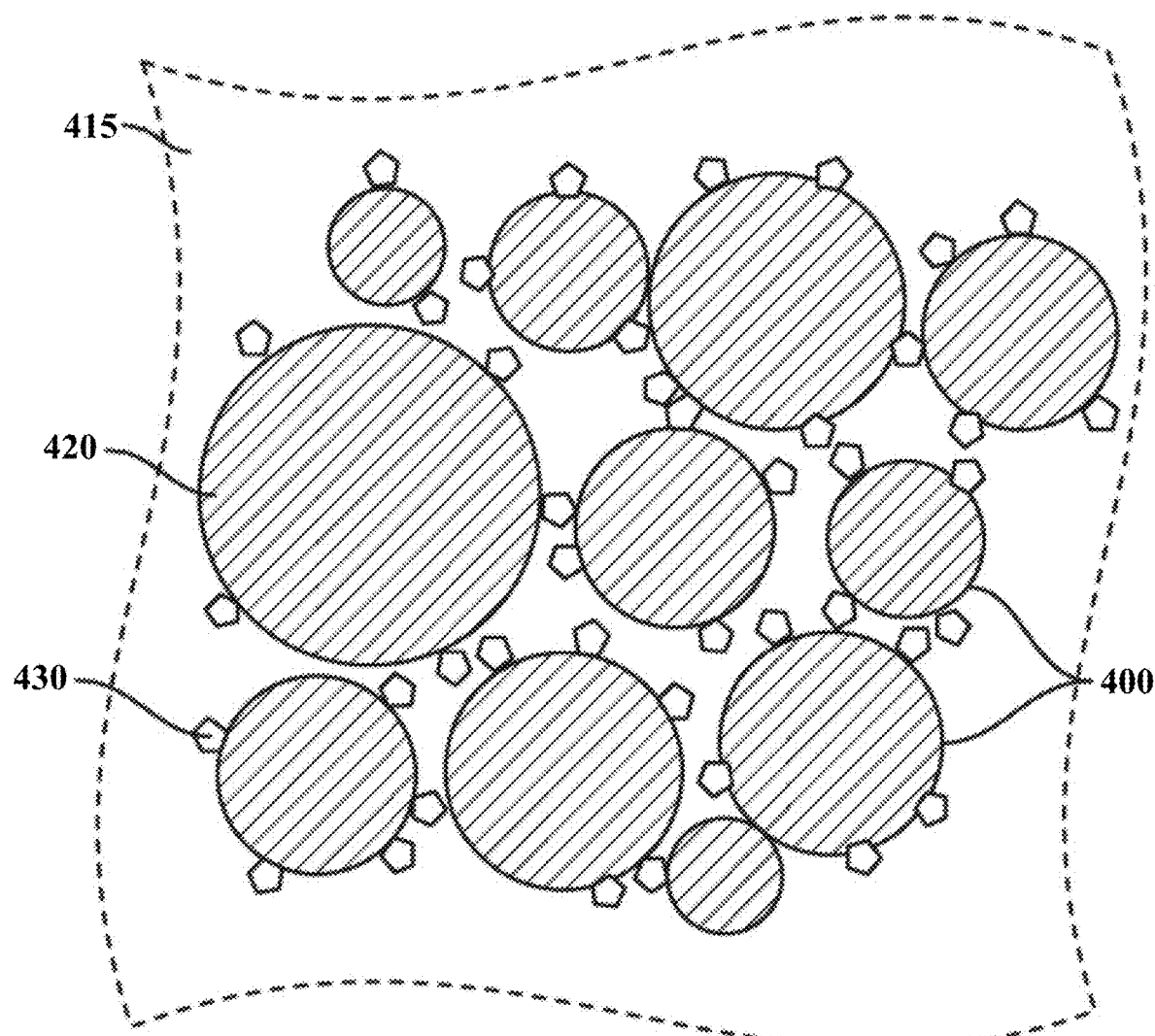
FIG. 4 shows a partially dense brown body that is obtained following debinding, but prior to sintering.

Removal of the thermoplastic polymer 110, 210, 310 from the functionalized composite material is accomplished by debinding, as described elsewhere. FIG. 4 depicts a partially dense brown body 400 that is obtained following debinding, but prior to sintering. There is empty space 415 where the thermoplastic polymer 110, 210, 310 was previously, within the distinct volume, prior to debinding. Note that "empty space" includes air or other gases that may be present in or around the brown body 400. Also, residual polymer or other impurities may be present within the empty space 415. Preferably, the brown body 400 does not contain any thermoplastic polymer. The brown body 400 includes discrete particulates 430 assembled on the surfaces of discrete metal or metal alloy particles 420. Note that FIG. 4 is similar to FIG. 1, but without the thermoplastic polymer present. However, the brown body 400 may be fabricated starting with any of the functionalized composite materials 100, 200, 300 in FIG. 1, 2, or 3, respectively.

The method may further comprise metal injection molding and/or additive manufacturing the functionalized composite material. The debinding of the functionalized composite material may occur during metal injection molding and/or additive manufacturing, or prior to such processing. During or after metal injection molding and/or additive manufacturing, the discrete particulates may function as a grain refiner, a sintering aid, a strengthening phase, or a combination thereof.

For example, after the part geometry is defined by the thermoplastic polymer binder matrix, the discrete particulates remain adhered to the surface of the metal alloy powder during debinding and may serve to control microstructure of the sintered alloy powder. There are various mechanisms that may apply, without being limited by speculation. For example, the discrete particulates may react with an oxide layer on the surface of the powder, thereby reducing the energy required for sintering. In these or other embodiments, the discrete particulates may react with the powder (discrete particles) itself as it is partially melted to form an intermetallic phase that induces formation and growth of preferential microstructures (grain sizes or orientations), thereby preventing tearing or cracking as the part is cooled and the liquid volume fraction is reduced.

A unique microstructure may be produced in the final part. Incorporation of previously impossible compositions, concentrations, and types of grain refiners is possible compared to typical processes for forming metallic alloy powders (such as atomization), in this disclosure, due to grain-refining elements being disposed fully or partially on surfaces of base alloy powder. This process, in some embodiments, utilizes functionalization to incorporate grain refiners directly at the site of melting, negating the need for expensive processing and making use of commercially available alloy powders. This technique is in contrast to incorporation of grain refiners into the internal regions of powder particles, which requires extremely high temperatures during gas atomization. Such high temperatures can cause volatility of certain alloying elements (including Zn, Mg, and Li), and can be damaging to equipment due to the high reactivity of some elements in metal alloys.

In some embodiments, the metal alloy microstructure—produced starting with the functionalized composite material, followed by debinding and sintering—is "substantially crack-free" which means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions. Note that these inclusions are different than the desirable nanoparticle inclusions that may form during additive manufacturing.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may optionally be hot-isostatic-pressed to reduce residual porosity, to arrive at a final additively manufactured metal part that is substantially free of porous defects in addition to being substantially crack-free.

In some embodiments, the final metal alloy microstructure has "equiaxed grains" which means that at least 99 vol % of the metal alloy contains grains that are roughly equal in length, width, and height. In the metal alloy, crystals of metal alloy form grains in the solid. Each grain is a distinct crystal with its own orientation. The areas between grains are known as grain boundaries. Within each grain, the individual atoms form a crystalline lattice. Equiaxed grains result when there are many nucleation sites arising from the discrete particulates.

Some embodiments of the present invention utilize materials, methods, and principles described in commonly owned U.S. patent application Ser. No. 15/209,903, filed Jul. 14, 2016, U.S. patent application Ser. No. 15/808,872, filed Nov. 9, 2017, U.S. patent application Ser. No. 15/808,877, filed Nov. 9, 2017, U.S. patent application Ser. No. 15/808,878, filed Nov. 9, 2017, U.S. patent application Ser. No. 15/880,474, filed Jan. 25, 2018, and/or U.S. patent application Ser. No. 15/880,488, filed Jan. 25, 2018, each of which is hereby incorporated by reference herein. This specification also hereby incorporates by reference herein Martin et al., "3D printing of high-strength aluminium alloys," Nature vol. 549, pages 365-369 and supplemental online content (extended data), Sep. 21, 2017, in its entirety.

EXAMPLE

Composites and structures embodied by the present invention have been reduced to practice for a model functionalized composite material consisting of an aluminum alloy powder (Al 7075), zirconium hydride (ZrH 2) particulates, and a wax/polyethylene blended thermoplastic binder.

Figure 5A:
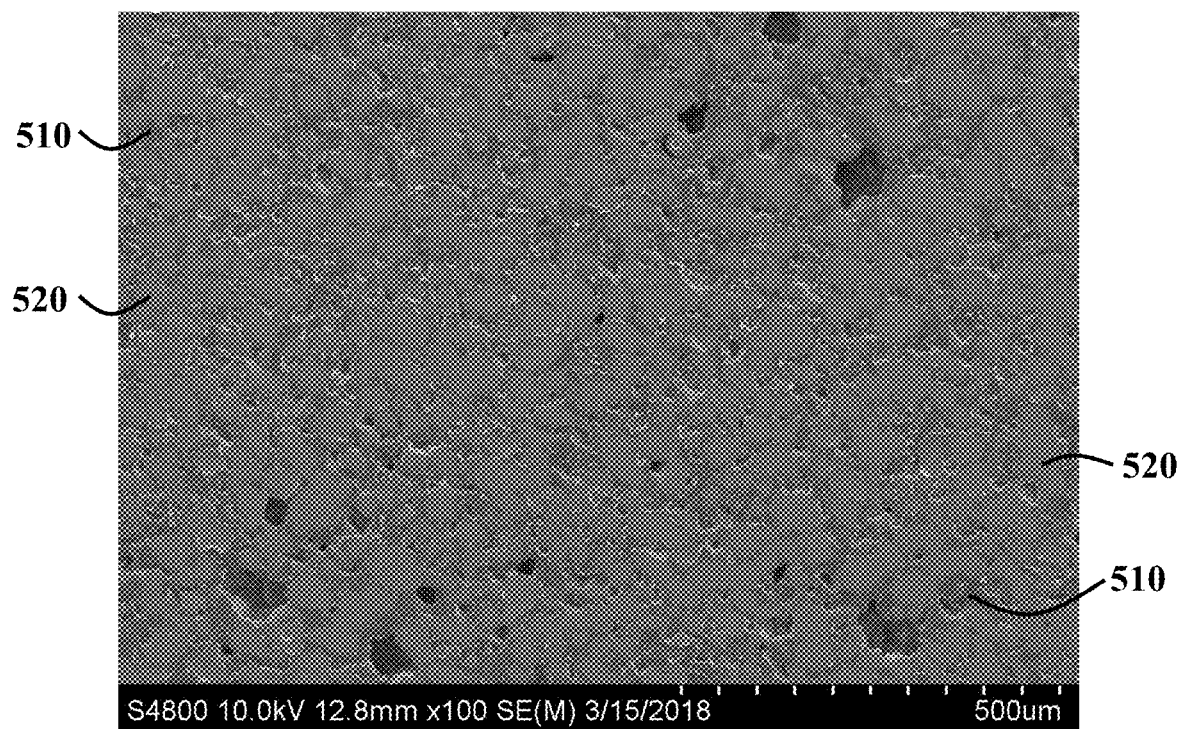
FIG. 5A shows a SEM image (scale bar 500 µm) of a functionalized composite material in which $ZrH_2$ particulates are assembled on the surfaces of discrete aluminum alloy particles, with a wax/polyethylene polymer that encapsulates and is in contact with both the aluminum alloy particles as well as the $ZrH_2$ particulates.
Figure 5B:
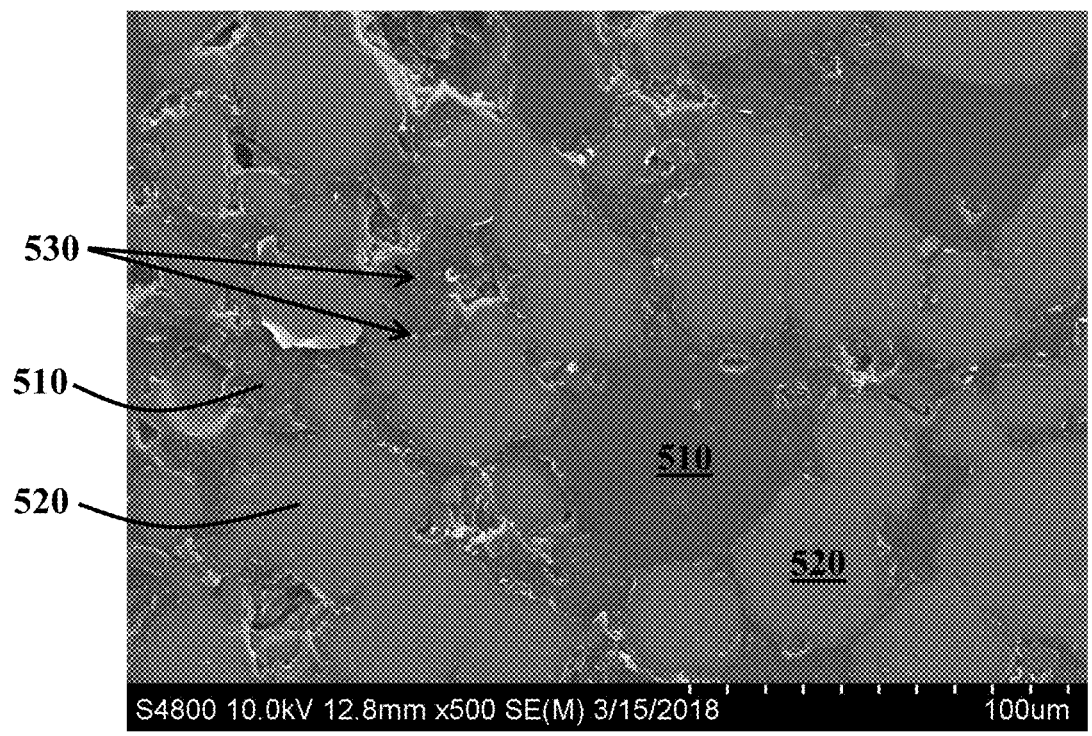
FIG. 5B shows a SEM image (scale bar 100 µm) of a functionalized composite material in which $ZrH_2$ particulates are assembled on the surfaces of discrete aluminum alloy particles, with a wax/polyethylene polymer that encapsulates and is in contact with both the aluminum alloy particles as well as the $ZrH_2$ particulates.

FIGS. 5A and 5B show SEM images of the functionalized composite material 500 in which ZrH 2 particulates 530 are assembled on the surfaces of discrete aluminum alloy particles 520. A wax/polyethylene polymer 510 encapsulates and is in contact with both the aluminum alloy particles 520 as well as the ZrH 2 particulates 530, within a distinct volume. The scale bar of FIG. 5A is 500 μm and the scale bar of FIG. 5B is 100 μm. The $ZrH_2$ particulates 530 are labeled in FIG. 5B but not in FIG. 5A. In the SEM images, the lighter-colored, more contiguous regions are the metal powder and are approximately 60% of the image. The darker-colored regions are the thermoplastic binder. The small particulates on the surfaces of the powder and within the binder are the ZrH 2 particulates.

FIG. 6 shows an optical image of a compounded pellet 600 of the functionalized composite material (the same material shown in FIG. 5B).

Figure 7:
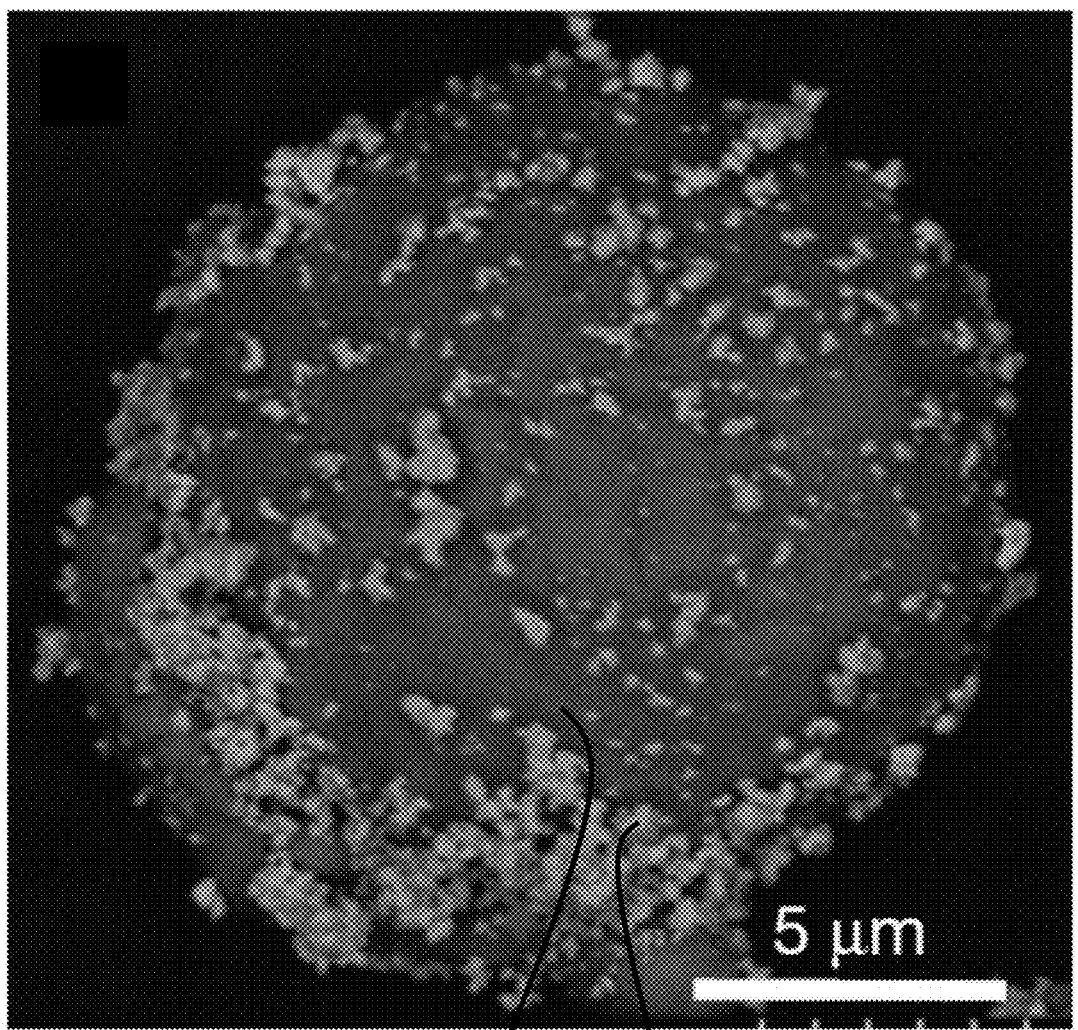
FIG. 7 shows a SEM image of zirconium hydride particulates assembled on the surface of an aluminum 7075 alloy powder.

FIG. 7 shows a SEM image of zirconium hydride particulates 720 assembled on the surface 710 of an aluminum 7075 alloy powder.

Figure 8A:
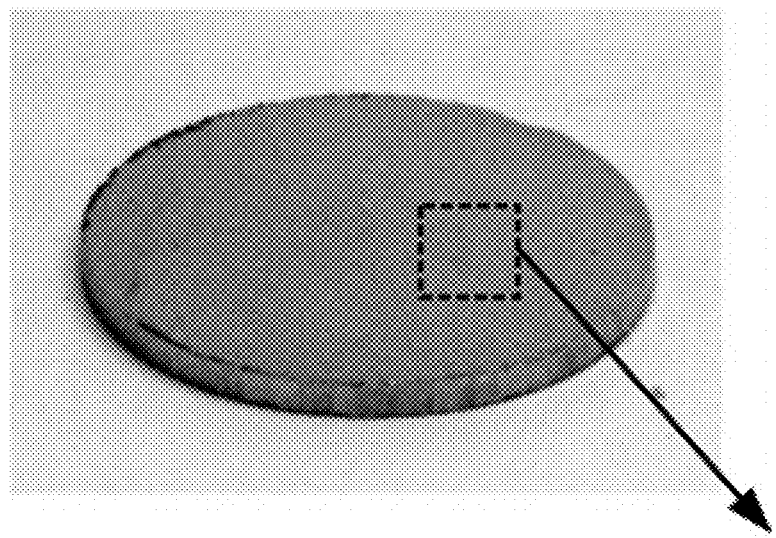
FIG. 8A shows an optical image of aluminum 7075 alloy powder plus zirconium hydride nanoparticles sintered to form a dense disk with greater than 95% of theoretical density.
Figure 8B:
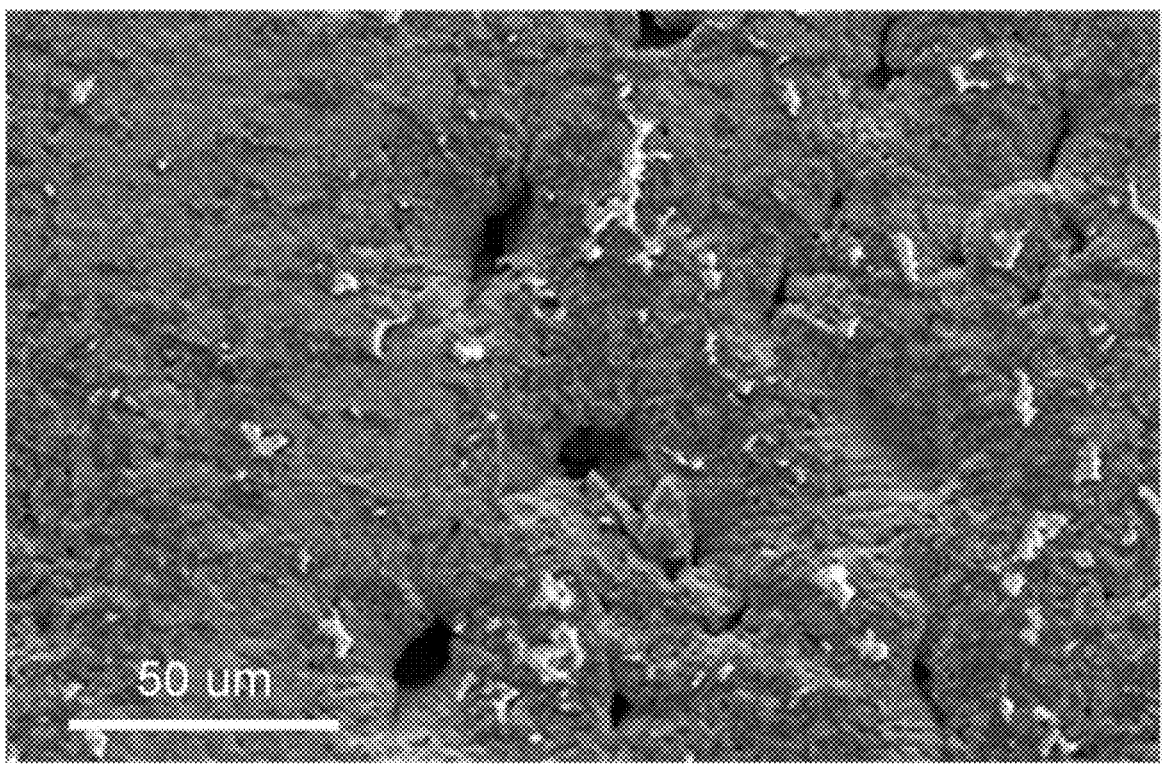
FIG. 8B shows a SEM image of aluminum 7075 alloy powder plus zirconium hydride nanoparticles sintered to form a dense disk, revealing necking during consolidation and alloy powder cohesion during sintering.

FIG. 8A shows an optical image of aluminum 7075 alloy powder plus zirconium hydride nanoparticles sintered to form a dense disk with greater than 95% of theoretical density. FIG. 8B is a zoomed-in portion of FIG. 8A, showing a SEM image (scale bar=50 μm) that reveals necking during consolidation and alloy powder cohesion during sintering.

Variations of the invention are applicable to a wide variety of additive manufacturing and metal injection molding processes for high-performance alloys that can be incorporated within a thermoplastic binder. Examples include, but are not limited to, aluminum alloys, titanium alloys, cobalt-chrome alloys, stainless steels, and tungsten carbide. Some specification applications are gears, power transmission, and rotating machinery; hinges, brackets, enclosures, and mounting hardware; ducting and flow-control devices; rocker arms and turbocharger valves; and injectors and combustion chambers, to name a few. In some cases, due to limitations of debinding operations, applications are best suited when ultra-precise tolerances (below ±0.5%) or full density (>99%) are not required.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A functionalized composite material comprising:
   (a) a thermoplastic polymer binder matrix disposed in a distinct volume;
   (b) a plurality of discrete metal or metal alloy particles dispersed in said thermoplastic polymer matrix, wherein said discrete metal or metal alloy particles comprise an element selected from the group consisting of aluminum, iron, titanium, nickel, and alloys or intermetallics thereof, and wherein said discrete metal or metal alloy particles have an average particle size from about 1 micron to about 1 centimeter; and (c) a plurality of discrete particulates fully assembled on surfaces of said discrete metal or metal alloy particles in the form of an intermittent coating of said discrete particulates, wherein said discrete particulates comprise a material selected from the group consisting of metals, ceramics, polymers, carbon, and nitrides, hydrides, carbides, oxides, or alloys thereof, and combinations of any of the foregoing, wherein said discrete particulates are in contact with said thermoplastic polymer binder matrix, wherein said discrete particulates occupy from about 1 vol % to about 25 vol % of said distinct volume, wherein said discrete particulates are smaller than said discrete metal or metal alloy particles in at least one dimension, wherein said discrete particulates are compositionally different than said discrete metal or metal alloy particles, and wherein said discrete particulates have an average particulate size from about 5 nanometers to about 1000 nanometers, wherein said discrete particulates fully assembled on surfaces of said discrete metal or metal alloy particles structurally establish surface-functionalized discrete metal or metal alloy particles, and wherein said thermoplastic polymer binder matrix entirely and continuously surrounds said surface-functionalized discrete metal or metal alloy particles.

2. The functionalized composite material of claim 1, wherein said discrete metal or metal alloy particles have an average particle size from about 1 micron to about 1 millimeter.

3. The functionalized composite material of claim 1, wherein said discrete metal or metal alloy particles have a geometric shape selected from the group consisting of spherical, ellipsoidal, faceted, rod, platelet, asymmetric, and combinations thereof.

4. The functionalized composite material of claim 1, wherein said discrete particulates are discrete nanoparticles.

5. The functionalized composite material of claim 1, wherein said discrete particulates have a geometric shape selected from the group consisting of spherical, ellipsoidal, faceted, rod, platelet, asymmetric, and combinations thereof.

6. The functionalized composite material of claim 1, wherein said thermoplastic polymer binder matrix occupies from about 25 vol % to about 50 vol % of said distinct volume.

7. The functionalized composite material of claim 1, wherein said thermoplastic polymer binder matrix occupies from about 50 vol % to about 75 vol % of said distinct volume.

8. The functionalized composite material of claim 1, wherein said discrete metal or metal alloy particles occupy from about 50% to about 75 vol % of said distinct volume.

9. The functionalized composite material of claim 1, wherein said discrete metal or metal alloy particles occupy from about 25 vol % to about 50 vol % of said distinct volume.

10. The functionalized composite material of claim 1, wherein said discrete particulates occupy from about 3 vol % to about 10 vol % of said distinct volume.

11. The functionalized composite material of claim 1, wherein said thermoplastic polymer binder matrix comprises a polymer selected from the group consisting of natural or synthetic wax, paraffins, polyethylene, oxidized polyethylene, poly(ethylene-co-acrylic acid), polybutane, poly(vinyl acetate), polyacetyl, poly(ethylene-co-vinyl acetate), polystyrene, poly(methyl methacrylate), poly(vinyl butyral), polypropylene, or poly(ethylene glycol), and combinations thereof.

12. The functionalized composite material of claim 1, wherein said thermoplastic polymer binder matrix further comprises an additive selected from the group consisting of lubricants, pigments, catalysts, stabilizers, viscosity modifiers, and combinations thereof.

13. The functionalized composite material of claim 1, wherein said functionalized composite material is in the form of a feedstock selected from the group consisting of a powder, a pellet, a discontinuous rod, a continuous filament, a continuous wire, a continuous fiber, a sheet, a ribbon, and combinations thereof.

14. The functionalized composite material of claim 13, wherein said feedstock is a metal injection molding feedstock or an additive manufacturing feedstock.

* * * * *